(12) United States Patent
Zoppas et al.

(10) Patent No.: US 11,166,349 B2
(45) Date of Patent: Nov. 2, 2021

(54) INDUCTION HOB AND METHOD FOR MAKING INDUCTION HOBS

(71) Applicant: I.R.C.A. S.P.A.—INDUSTRIA RESISTENZE CORAZZATE E AFFINI, Vittorio Veneto (IT)

(72) Inventors: Federico Zoppas, Treviso (IT); Fabrizio Dughiero, Piove di Sacco (IT)

(73) Assignee: I.R.C.A. S.P.A.—INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 574 days.

(21) Appl. No.: 16/079,966

(22) PCT Filed: Feb. 28, 2017

(86) PCT No.: PCT/IB2017/051157
§ 371 (c)(1),
(2) Date: Aug. 24, 2018

(87) PCT Pub. No.: WO2017/149445
PCT Pub. Date: Sep. 8, 2017

(65) Prior Publication Data
US 2019/0075622 A1   Mar. 7, 2019

(30) Foreign Application Priority Data

Mar. 2, 2016   (IT) .................. 102016000022070

(51) Int. Cl.
*H05B 6/12*   (2006.01)
(52) U.S. Cl.
CPC ......... *H05B 6/1245* (2013.01); *H05B 6/1281* (2013.01); *H05B 2206/022* (2013.01); *Y02B 40/00* (2013.01)

(58) Field of Classification Search
CPC ............ H05B 2206/022; H05B 6/1245; H05B 6/1281; Y02B 40/00; Y02B 40/126
(Continued)

(56) References Cited

U.S. PATENT DOCUMENTS 3,256,417 A * 6/1966 Merrett ................ H01F 5/00
219/675
3,736,543 A   5/1973 Lademann et al.
(Continued)

FOREIGN PATENT DOCUMENTS

CN   101828426 A   9/2010
CN   105325054 A   2/2016
(Continued)

OTHER PUBLICATIONS

International Preliminary Report on Patentability for International Application No. PCT/IB2017/051157 filed Feb. 28, 2017 on behalf of I.R.C.A. S.P.A—Industria Resistenze, dated Jun. 5, 2018. 5 pages.
(Continued)

*Primary Examiner* — Ibrahime A Abraham
*Assistant Examiner* — Ket D Dang
(74) *Attorney, Agent, or Firm* — Steinfl + Bruno, LLP (57) ABSTRACT

An induction hob includes a main body with an upper main surface on which in use at least one pan to be heated can be placed, and a lower main surface. The induction hob also includes at least one inductor coupled to the main body at the lower main surface, and a flexible body, fixed to the lower main surface. The flexible body has alternating first, electrically insulating layers and second layers each including at least one electrically conductive track. The inductor has a plurality of such electrically conductive tracks, which are
(Continued)

positioned at different second layers and are electrically connected to each other in series and/or parallel to form a plurality of loops.

17 Claims, 4 Drawing Sheets

(58) Field of Classification Search
USPC ....... 219/620, 622, 624, 625, 627, 662, 671, 219/672, 675
See application file for complete search history.

(56) References Cited

U.S. PATENT DOCUMENTS

| | | | | |
|---|---|---|---|---|
| 3,989,916 | A | * | 11/1976 | Amagami ............... H05B 6/065 219/622 |
| 4,959,631 | A | * | 9/1990 | Hasegawa ........... H01F 17/0006 336/83 |
| 5,369,249 | A | * | 11/1994 | Kwon ................... H05B 6/1245 219/624 |
| 6,144,019 | A | * | 11/2000 | Garcia ................. H05B 6/1281 219/624 |
| 2009/0289054 | A1 | | 11/2009 | Williams et al. |
| 2010/0277267 | A1 | | 11/2010 | Bogert et al. |
| 2012/0118874 | A1 | | 5/2012 | Williams et al. |
| 2012/0138596 | A1 | * | 6/2012 | Alonso Esteban ..... C03C 17/36 219/600 |
| 2013/0199027 | A1 | * | 8/2013 | Singh ................... H04B 5/0068 29/602.1 |
| 2015/0382407 | A1 | | 12/2015 | Reischmann et al. |
| 2016/0150596 | A1 | | 5/2016 | Burkhardt et al. |
| 2018/0332671 | A1 | | 11/2018 | Reischmann et al. |

FOREIGN PATENT DOCUMENTS

| | | |
|---|---|---|
| DE | 102005056501 A1 | 5/2007 |
| JP | 2012526387 A | 10/2012 |
| WO | 2009/143199 A1 | 11/2009 |
| WO | 2010/129228 A1 | 11/2010 |
| WO | 2010/129230 A1 | 11/2010 |
| WO | 2010/129256 A1 | 11/2010 |
| WO | 2010/129344 A1 | 11/2010 |
| WO | 2010/129349 A1 | 11/2010 |
| WO | 2010/129352 A1 | 11/2010 |
| WO | 2010/129392 A1 | 11/2010 |
| WO | 2013/112436 A1 | 8/2013 |
| WO | 2015/000641 A2 | 1/2015 |

OTHER PUBLICATIONS

International Search Report for International Application No. PCT/IB2017/051157 filed Feb. 28, 2017 on behalf of I.R.C.A. S.P.A—Industria Resistenze, dated May 31, 2017. 3 pages.

Written Opinion for International Application No. PCT/IB2017/051157 filed Feb. 28, 2017 on behalf of I.R.C.A. S.P.A—Industria Resistenze, dated May 31, 2017. 7 pages.

Italian Search Report for Italian Patent Application No. 102016000022070 filed Mar. 2, 2016 on behalf of I.R.C.A. S.P.A. dated Nov. 9, 2016. 9 pages.

* cited by examiner

INDUCTION HOB AND METHOD FOR MAKING INDUCTION HOBS

CROSS REFERENCE TO RELATED APPLICATIONS

The present application is the U.S. national stage of International Patent Application PCT/IB2017/051157 filed internationally on Feb. 28, 2017, which, in turn, claims priority to Italian Patent Application No. 102016000022070 filed on Mar. 2, 2016.

This invention relates to an induction hob and a method for making induction hobs. It should be noticed that in the context of this invention the term "hob" may refer to the finished object ready for market (that is to say, equipped with control interfaces and/or electronic control devices) or only the active part of it, that is to say, the part comprising only the mechanical structure and the inductors.

As is known, induction hobs are systems that are alternatives to traditional gas stoves or electric heating element cookers, which allow heat to be generated directly in the ferromagnetic base of the pan.

Generally, induction hobs comprise a main body (also commonly known as the hob or top) which has an upper surface on which the pans to be heated can be placed. Although in most induction hobs on the market the main body is constituted of a flat sheet of electrically insulating and diamagnetic material (such as glass, ceramic or glass-ceramic), there are also, especially in the professional catering sector, hobs whose main body has other shapes, for example hobs whose main body has a concavity at the top, designed to accommodate a wok in an optimum way.

Applied to the other face of the main body, which advantageously has uniform thickness, are one or more inductors constituted of a plurality of loops wound about a central axis that is usually perpendicular to the upper surface of the main body. In most cases, the inductors have an overall spiral shape (circular or square) with the loops extending in sequence along trajectories that gradually move away from the central axis.

As regards the positioning of the inductors relative to the hob, whilst in traditional embodiments there was always an inductor at just a few specific positions like the situation for a gas stove, in many more recent embodiments an electronic control technology has been introduced which allows the pan to be positioned anywhere on the hob. According to that technology, the entire lower surface of the main body (at the zone of possible use) is substantially covered with relatively small inductors, which can be activated independently of one another. When the hob is switched on, the electronic control system is usually able to activate and power exclusively those inductors that, according to a check of the related electrical impedance, are coupled to a ferromagnetic "load".

Whilst in the traditional technology an induction hob usually comprises between four and six inductors, in the technology just described there may be several dozen.

In structural and construction terms, there are two most important factors to be considered: on one hand the correct positioning of the inductors relative to the main body (especially as regards the distance that has to be precisely controlled and must remain unchanged with the passage of time); and on the other hand the sturdiness of the system and in particular of the main body which is usually constituted of a fragile material such as glass or ceramic material. Any possibility of knocking the inductor against the main body must, therefore, be avoided.

In fact, in practically all of the known commercial applications, each inductor is a rigid object that comprises a supporting structure which supports both the loops, usually made of Litz wire, and a flow concentrator normally constituted of a ferrite disk or of multiple ferrite blocks arranged on the other side of the inductor relative to the main body.

According to the prior art, there are two main ways of building the induction hob.

The first way involves the inductors being rigidly supported by a supporting frame, being coated with a layer of thermally insulating material such as glass wool and the main body being substantially squashed on that insulating layer, thereby preventing movements of the inductors and the main body relative to one another.

In contrast, the second way involves the inductors having a surface that faces towards the main body and reproduces the shape of the lower surface of the latter and rests directly on said lower surface. To avoid the risks of breakage of the main body due to contact between two rigid bodies, in this case too the inductors are mounted on the supporting frame, but with pre-compressed springs interposed between them and the frame. The springs press the inductors against the main body, dampening any recoil from accidental knocks during movement.

It is easy to sense how both of the prior art construction methods are relatively complex and expensive, especially due to the fact that they almost inevitably require considerable labour, particularly for more complex cases in which the hob comprises a large number of inductors.

Second, despite the above-mentioned construction devices, because of the way they are designed, prior art hobs are always significantly at risk of breakage. Therefore, in order to guarantee their resistance to knocks, required by the regulations in force, the thickness of the main body cannot be brought below relatively high values.

Furthermore, given the complexity of the related structure, prior art induction hobs are relatively heavy and bulky objects.

Finally, it should be noticed that at a scientific level, the article by I. Lope et al. "Printed circuit board inductors for domestic induction heating", HES-13 Heating by Electromagnetic Sources—p. 245, also covered the subject of possible use in a domestic context of inductors integrated in printed circuit boards as alternatives to normal Litz wire inductors, but apparently without significant results in industrial terms.

In this context, the technical purpose which forms the basis of this invention is to provide an induction hob and a method for making induction hobs which overcome the above-mentioned disadvantages.

In particular, the technical purpose of this invention is to provide a method for making induction hobs that is simpler than the prior art methods and at the same time allows hobs to be made which are less affected by knocks than prior art hobs are.

It is also the technical purpose of this invention to provide an induction hob that is lighter and more manageable than those currently on the market.

The technical purpose specified and the aims indicated are substantially achieved by an induction hob and by a method for making induction hobs as described in the appended claims.

Further features and the advantages of this invention are more apparent in the detailed description, with reference to the accompanying drawings which illustrate several preferred, non-limiting embodiments of an induction hob and of a method for making induction hobs, in which.

With reference to the accompanying figures the numeral 1 denotes in its entirety an induction hob made in accordance with this invention.

In order to make the entire explanation clearer, hereinafter first there is a description of the method according to this invention, then of the induction hob 1 that can be made using that method. All of the information supplied hereinafter with reference, respectively, to the method and to the hob 1 according to this invention, within the limits in which it is possible, shall also be considered to refer, respectively, to the hob 1 and to the method.

Figure 2:
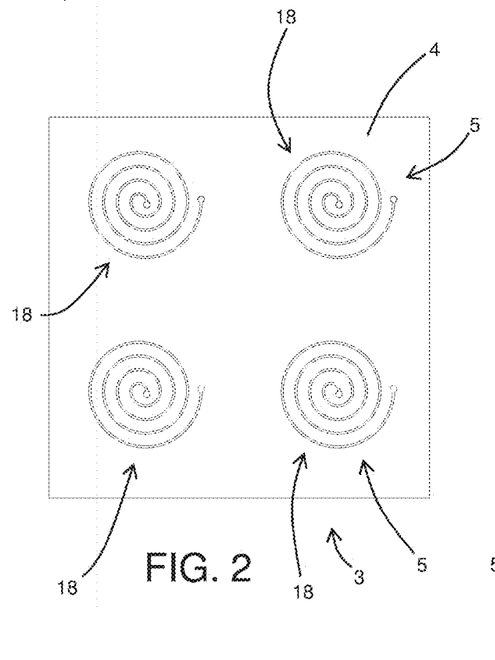
FIG. 2 is a schematic plan view of a first possible layout regarding distribution of the inductors in a flexible module usable for making a hob according to this invention.
Figure 3:
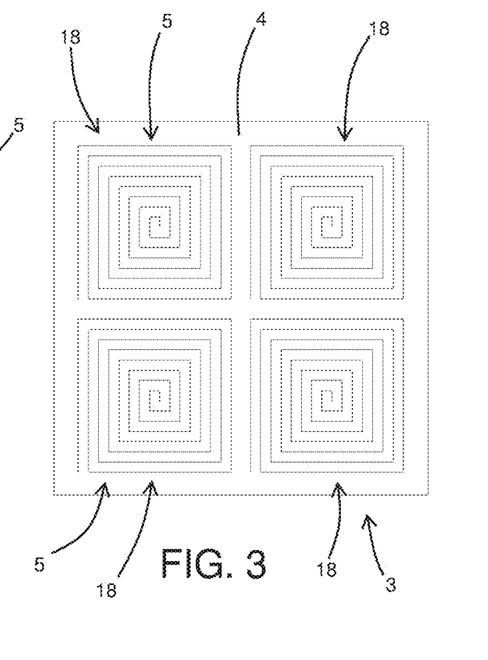
FIG. 3 is a schematic plan view of a second possible layout regarding distribution of the inductors in a flexible module usable for making a hob according to this invention.
Figure 4:
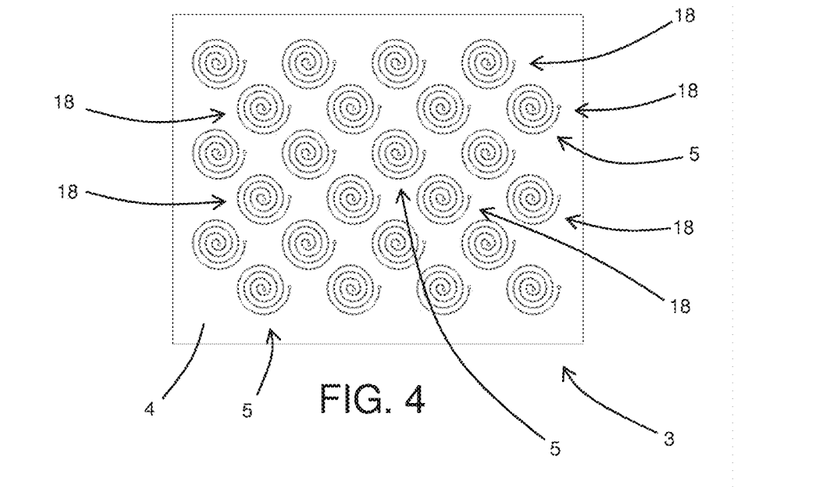
FIG. 4 is a schematic plan view of a third possible layout regarding distribution of the inductors in a flexible module usable for making a hob according to this invention.

In its most general embodiment, the method for making induction hobs 1 according to this invention allows hobs 1 with any number of inductors to be made. Therefore, the method will be described below initially with reference to the case of making a hob 1 equipped with a single inductor 2, followed by a description of only what changes if two or more inductors 2 are present. The method involves first creating a plurality of flexible modules 3, each comprising a first, electrically insulating (and preferably diamagnetic) layer 4 and a second layer 20 which comprises one or more separate electrically conductive tracks 5 which are stuck to the first layer 4. In other words, in each flexible module 3 the first layer 4 constitutes a support on which one or more raised electrical conductors extend, advantageously bare (without surface insulation). Each electrically conductive track 5 extends along a trajectory that may adopt many different shapes. For example, the trajectory may correspond to that of a typical pancake inductor 2 such as those illustrated in FIGS. 2 and 3 (described in more detail below) or to part of it (for example, corresponding to around half or one quarter of a turn about the centre). However, in general, as will become more apparent from the following description, the trajectory of extension of each electrically conductive track 5 coincides, at least for the main operating part (an exception may be made for the ends or other electrical connection stretches), with a loop, or a part of it, of what will be the inductor 2 that will be obtained at the end of the method described herein.

Moreover, advantageously, each electrically conductive track 5 has a substantially rectangular or trapezoidal cross-section (respectively with the larger side or larger base stuck to the first layer 4). Furthermore, in many applications, the shape of the electrically conductive tracks 5 in a single flexible module 3 may be such that it resembles "in a broken line" a typical shape of prior art inductors 2 such as the pancake types (see FIG. 12 where each "stretch" of the "broken line" corresponds to approximately half a loop).

As regards the materials, the first layer 4 may be constituted of, or comprise, vulcanised silicone rubber, a polyimide such as that marketed with the Kapton® trademark by the U.S. Company Du Pont, or an aramid paper such as that marketed with the Nomex® trademark, again by Du Pont. Moreover, a specific adhesive (advantageously silicone or acrylic, able to withstand top temperatures of at least 200° C., preferably of at least 220° C.) can be applied to the first layer 4. This adhesive is designed to allow the connection between the first layer 4 and the electrically conductive tracks 5. For the electrically conductive tracks 5, advantageously a non-ferromagnetic metal material is used, for example copper or aluminium, or a conductive ink.

As regards the thicknesses, in the embodiments currently preferred, the thickness of the first layer 4 may vary between 25 and 250 μm, that of the electrically conductive tracks 5 between 25 and 300 μm, and that of the adhesive between 12 and 100 μm.

In a first preferred embodiment of the method according to this invention, the step of creating each flexible module 3 in turn comprises the steps of coupling a first, electrically insulating sheet 6, which forms the first layer 4 to a second, electrically conductive sheet 7, and obtaining from the second sheet 7 the one or more electrically conductive tracks 5 stuck to the first layer 4, by localised removal of the entire thickness of the second sheet 7 in all of the zones in which the electrically conductive tracks 5 are not meant to be present.

Figure 5:
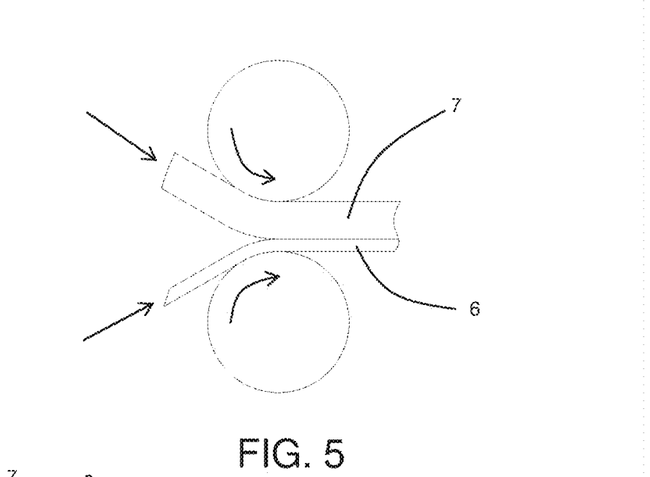
FIG. 5 is a schematic side view of a first step of a method according to this invention, for making induction hobs.

The coupling of the first sheet 6 (advantageously with the adhesive on it) and the second sheet may preferably be obtained by cold or hot rolling (FIG. 5).

Figure 6:
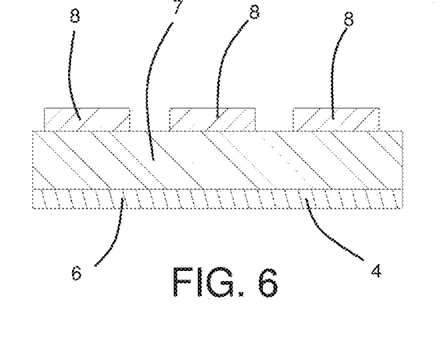
FIG. 6 is a schematic side view in cross-section of a second step of the method according to this invention.
Figure 7:
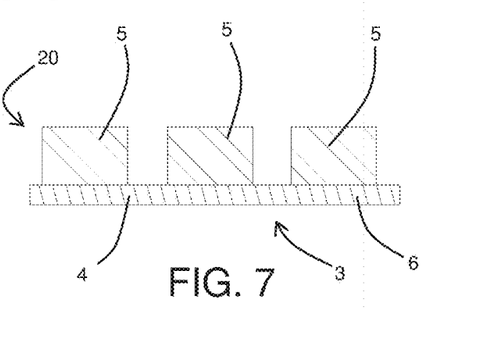
FIG. 7 is a schematic side view in cross-section of the result of a third step of the method according to this invention.

In contrast, localised removal of the second sheet 7 may advantageously be performed using the etching technique for metals (which is known and therefore not described in detail). That is to say, first, locally covering the second sheet 7 with a protective material 8 (FIG. 6) only at the electrically conductive tracks 5 to be obtained, and subjecting the second sheet 7, locally protected in that way, to a chemical treatment (usually by immersion or spraying) that completely removes the metal material by erosion (the selected treatment will have to be such that it only attacks the metal, not the electrically insulating layer and not the protective material 8—for example, ferric chloride is to be used). Advantageously, the protective material 8 is constituted, in the known way in etching, of a photosensitive film suitably treated so that it is resistant to chemical corrosion (relative to the above-mentioned chemical treatment) at the electrically conductive tracks 5 to be obtained, and not resistant in the other zones. Once the entire second sheet 7 has been removed in the relevant zones, depending on requirements a subsequent chemical treatment may or may not be performed. The latter has a different level of aggressiveness, for removing the protective material 8 (this second treatment will have to be active only on the protective material 8, not on metal and the first layer 4). The end product obtained is schematically illustrated in FIG. 7, although the adhesive is not shown and the cross-section of the electrically conductive tracks 5 is shown as being rectangular whilst, in reality, due to exposure to the first chemical treatment, the smaller sides of the rectangles will be angled, defining a trapezium, or in any case converging towards the top.

In an alternative preferred embodiment of the method according to this invention, the step of creating each flexible module 3 in turn comprises the step of printing the electrically conductive tracks 5 directly on a first electrically insulating sheet 6, which forms the first layer 4, by the depositing of conductive ink (the electrically conductive tracks 5 are therefore substantially printed on the first layer 4 by means of an ink printing process).

Advantageously, the flexible modules 3 may be made from first sheets 6 that are already the correct final size or, preferably, the first sheets 6 are obtained by shearing/cutting from continuous webs after application of the second sheet 7 and before or after formation of the electrically conductive tracks 5.

Depending on requirements, the flexible modules 3 may be made in such a way that they are all the same, or they may have different electrically conductive tracks 5.

Finally, each electrically conductive track 5 may either only have one main stretch, if necessary with enlarged ends, intended to be an active part of the loop of the inductor 2 of which it will be a part, or may also comprise one or more auxiliary stretches that are connected to the ends of the main stretch for bringing the electrical contacts of the related electrically conductive track 5 far from the main stretch and facilitating subsequent electrical connections.

Figure 8:
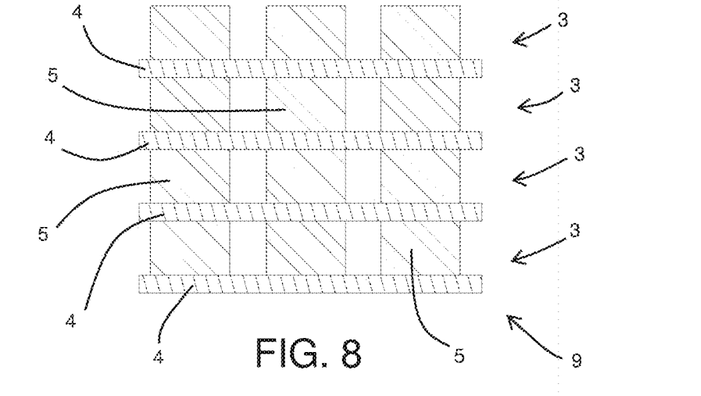
FIG. 8 is a schematic side view in cross-section of a fourth step of the method according to this invention.

The method according to this invention also comprises creating a flexible body 9 by superposing and coupling together the plurality of flexible modules 3 previously created, in such a way as to always place at least one first layer 4 between two successive second layers 20 (FIG. 8). Superposing of the flexible modules 3 is also preferably carried out in such a way that the electrically conductive tracks 5 are placed in predetermined positions relative to each other (in order to facilitate the electrical connections between them, as described in more detail below).

Advantageously, the coupling between the flexible modules 3 is achieved by gluing them to one another using an additive identical or similar to that used for connecting the first layer 4 and the electrically conductive tracks 5 of each layer. Moreover, preferably, thanks to the flexibility of the flexible modules 3 and their relatively limited thickness, after coupling each first layer 4 is made to adhere both to the electrically conductive tracks 5 on which it rests, and, where possible, also to the first layer 4 of the flexible module 3 to which those electrically conductive tracks 5 belong.

Figure 1:
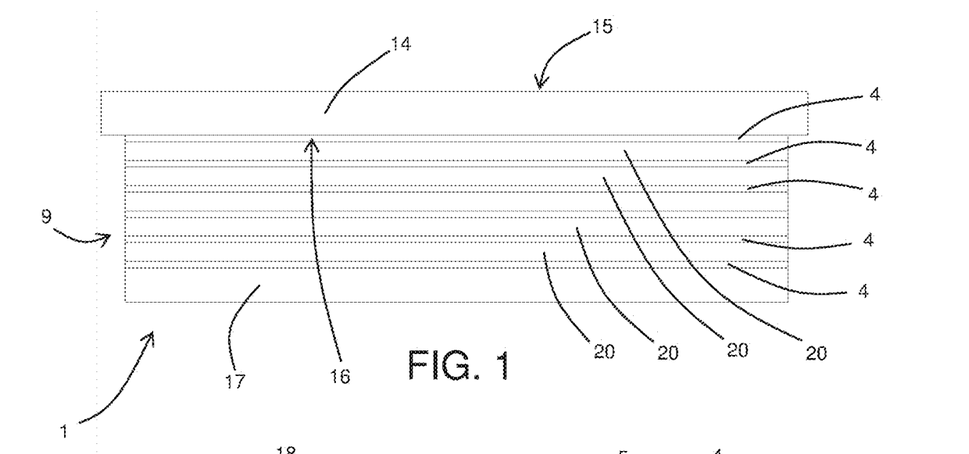
FIG. 1 is a schematic side view of the structure of an induction hob made according to this invention.

Finally, preferably, the flexible body 9 also comprises an additional electrically insulating layer (such as a further first layer 4) located in such a way that it closes the pack of superposed flexible modules 3 (FIG. 1).

As already indicated, advantageously, after the flexible body 9 has been created, the method comprises the operating step of electrically connecting together in series and/or parallel the electrically conductive tracks 5, to form a plurality of loops and thereby create the inductor 2. In particular, the connections are made in such a way that the loops extend in the same direction about a central axis substantially perpendicular to the main planes of extension of the first layers 4. It should also be noticed that said central axis is considered, at least at the design stage of the various flexible modules 3, and during the step of making the electrically conductive tracks 5 and during the subsequent step of superposing the flexible modules 3 which is performed in such a way as to make the central axis about which the electrically conductive tracks 5 of each second layer 20 extend coincide. In the simplest embodiment in which each flexible module 3 comprises a single electrically conductive tracks 5 that in itself forms one or more loops, and in which the electrically conductive tracks 5 of the various flexible modules 3 are practically identical (at least as regards the related main stretches), it is sufficient to connect them all together in series or parallel to obtain the inductor 2.

In contrast, when the electrically conductive tracks 5 of each layer each form only a portion of a loop (for example extending about the central axis only for half a turn or less), the connection between them is advantageously made by directly connecting each electrically conductive track 5 exclusively to electrically conductive tracks 5 of other flexible modules 3. Moreover, in general, the connection between the various electrically conductive tracks 5 is made in such a way as to create configurations of the loops designed in use to minimise unwanted effects of proximity and to allow the most uniform possible current distribution in the entire cross-section of the electrically conductive tracks 5.

Figure 9:
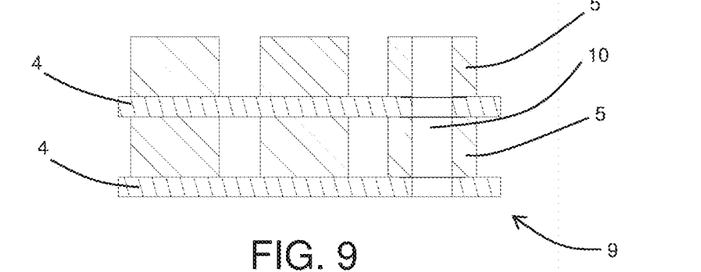
FIG. 9 is a schematic side view in cross-section of a possible fifth step of the method according to this invention.
Figure 10:
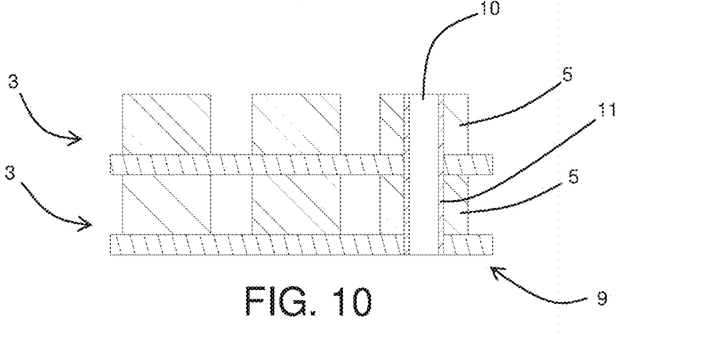
FIGS. 10 and 11 are schematic side views in cross-section of two alternative possible sixth steps of the method according to this invention.
Figure 11:
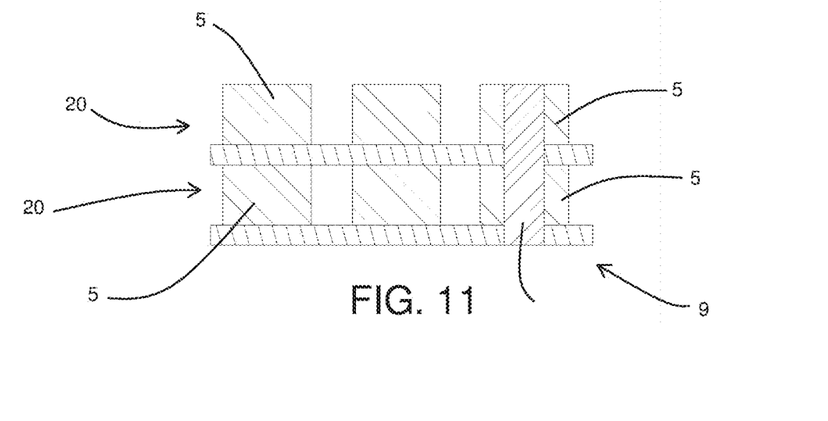

As illustrated in FIGS. 9 to 11, in accordance with a preferred embodiment, the electrical connection between the ends of the electrically conductive tracks 5 located on different flexible modules 3 may advantageously be made by aligning those ends along an axis parallel to the central axis, making a hole 10 through the flexible modules 3 involved (and any flexible modules 3 interposed between them) at the self-same ends (FIG. 9), and creating the electrical connection inside the hole 10, for example by metallising the hole 10 as illustrated in FIG. 10 (see the coating 11), or pouring a liquid metal 12 into it, as shown in FIG. 11.

Figure 12:
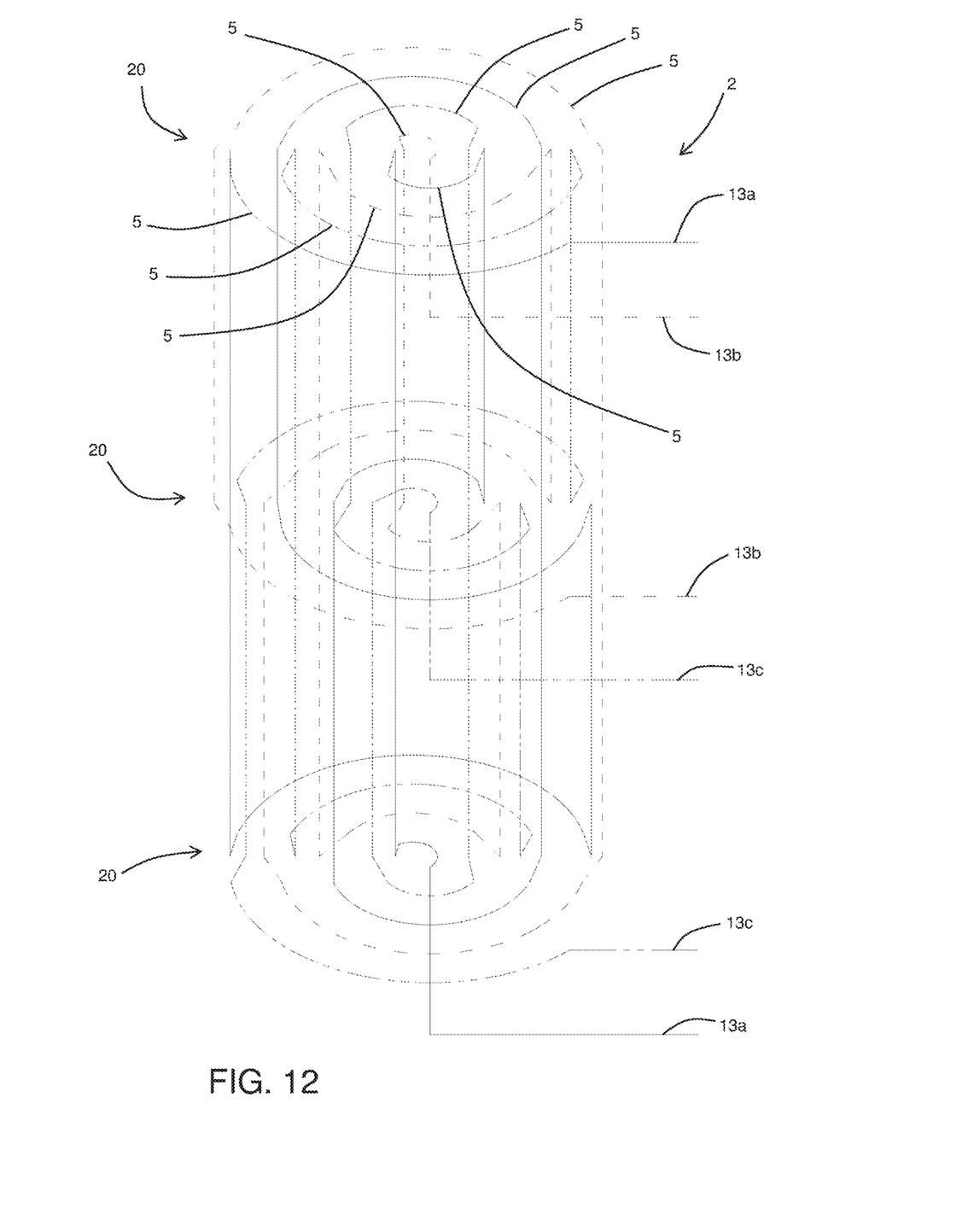
FIG. 12 is a schematic example of an inductor made according to a possible embodiment of the method according to this invention.

One example, provided by way of explanation only, of how to connect the electrically conductive tracks 5 to each other in order to create the loops of the inductor 2 is shown in FIG. 12. In this example, there are three superposed flexible modules 3, each equipped with a plurality of electrically conductive tracks 5 (for the sake of clarity, FIG. 12 only shows the electrically conductive tracks 5, not the first layers 4). In each flexible module 3 each electrically conductive track 5 extends about the central axis by approximately half a turn, whilst overall the electrically conductive tracks 5 are positioned one after another along a shared trajectory that substantially corresponds to that of a common pancake type spiral inductor 2. Moreover, as can be seen, in order to allow the electrical connection between the ends of the electrically conductive tracks 5, the ends of electrically conductive tracks 5 with corresponding positions relative to the overall pancake shape, that are located on different flexible modules 3, may be either aligned (parallel to the central axis) or out of alignment.

Moreover, in the example illustrated, the electrically conductive tracks 5 have been connected in such a way as to produce three separate multi-loop coils 13a, 13b, 13c (respectively illustrated with a continuous line, a dashed line and a line with two dots and one dash) which in turn may be connected in series or parallel and which, seen in plan view have a shape similar to that of a common pancake coil.

In any case, the connection between the various electrically conductive tracks 5 may be obtained according to any other pattern suitable for the purpose, for example based on the principles of exchange between the conductors described in the above-mentioned article by I. Lope et al. "Printed circuit board inductors for domestic induction heating", HES-13 Heating by Electromagnetic Sources—p. 245.

Also relative to the flexible body 9, there may be temperature sensors inserted in it (for example, interposed between the individual flexible modules 3). Furthermore, inserted in the flexible body 9 there may be proximity or contact or other sensors, which advantageously may in turn be constituted of/comprise one or more electrically conductive tracks 5 suitably made in one or more second layers 20.

Once the flexible body 9 is complete, the method according to this invention comprises taking a main body 14 that is rigid and comprises an upper main surface 15 and a lower main surface 16, which may be similar to any main body 14 currently commonly used for hobs 1. Advantageously, the main body 14 may be made of a diamagnetic material such as glass, ceramic or glass-ceramic material. Moreover, depending on requirements, the upper main surface 15 of the main body 14 may be flat, or curved (with one or more concavities/convexities), for example, similarly to the upper surfaces of prior art hobs.

At that point, the method comprises applying the flexible body 9 to the lower main surface 16, constraining it to the main body 14, advantageously using on the entire contact surface an adhesive such as that described above with reference to each flexible module 3.

In accordance with the preferred but not exclusive embodiment of this invention, the hob 1 is also equipped with a flow concentrator positioned on the other side of the inductor 2 relative to the main body 14. In this case, the step of creating the flexible body 9 also comprises a step of creating a stratiform base 17 for the plurality of coupled and superposed flexible modules 3, which is also flexible and at least partly constituted of a ferromagnetic material (preferably ferrite). In turn, the step of constraining the flexible body 9 to the lower main surface 16 is, in contrast, carried out in such a way that the coupled flexible modules 3 remain positioned between the main body 14 and the stratiform base 17.

According to a first embodiment, the step of creating the stratiform base 17 comprises the operating steps of:
  taking the ferromagnetic material in the form of powder or granules and
  embedding the ferromagnetic material in an electrically insulating matrix.

Advantageously, embedding is carried out when the matrix is in liquid or gel form, after which the matrix is made to solidify.

In contrast, according to an alternative embodiment, the step of creating the stratiform base 17 comprises the operating steps of
  creating a third layer constituted of the ferromagnetic material;
  applying the third layer to a first layer 4 of the plurality of coupled flexible modules 3 in such a way that it extends substantially perpendicularly to the central axis; and
  covering the third layer with an electrically insulating fourth layer.

Advantageously, the steps of creating and applying the third layer may be performed by spraying the ferromagnetic material (preferably in the form of paint) directly onto the first layer 4 involved.

Both the electrically insulating matrix of the first embodiment, and the fourth layer of the second embodiment are advantageously constituted of a vulcanised silicone rubber-based material.

What is described above may easily be extended to the case of making hobs 1 equipped with a plurality of inductors 2 distributed on them. In that case, the step of creating the plurality of flexible modules 3 may advantageously be carried out in such a way that in each flexible module 3 a plurality of separate predetermined zones 18 is identified, the number of these zones being equal to the number of inductors 2 to be obtained. Each predetermined zone may be considered centred on a respective central axis that is substantially perpendicular to the main plane of extension of the corresponding first layer 4. The central axes of each predetermined zone 18 will also have the same mutual arrangement in all of the flexible modules 3, so that they are superposable.

Moreover, advantageously, during the step of creating each flexible module 3, what is described above relative to making the electrically conductive tracks 5 should be considered valid for each of the predetermined zones 18. In fact, at each predetermined zone 18 each second layer 20 comprises one or more separate electrically conductive tracks 5 in accordance with embodiments described above.

Moreover, during the step of creating the flexible body 9, the flexible modules 3 are superposed, making all of the central axes of the predetermined zones 18 of each flexible module 3 coincide, whilst the step of electrically connecting together in series and/or parallel the electrically conductive tracks 5 is repeated independently at each group of predetermined zones 18 with aligned central axes, to create an inductor 2 at each central axis/each predetermined zone 18.

Irrespective of whether or not the hob 1 comprises a single inductor 2 or a plurality of inductors 2, as already indicated, advantageously, each flexible module 3, at each central axis present/defined in the self-same flexible module 3, is made with a plurality of electrically conductive tracks 5 that are electrically insulated from one another and each extending about the central axis by half a turn or less.

Furthermore, the step of electrically connecting to one another the electrically conductive tracks 5 of each flexible module 3 advantageously comprises connecting each electrically conductive track 5 belonging to one flexible module 5 to an electrically conductive track 5 belonging to a different flexible module 3.

With reference now to the induction hob 1 that is the subject matter of this invention, first it should be noticed that although the induction hob can advantageously be obtained using the method described above, that shall not be considered to limit the scope of this invention.

An induction hob 1 according to this invention, similarly to prior art induction hobs, comprises a main body 14, that in use is positioned on top, and that comprises an upper main surface 15 on which in use at least one pan to be heated can be placed, and a lower main surface 16.

At least one inductor 2 is coupled to the main body 14 at the lower main surface 16.

The hob 1 also comprises a flexible body 9 that is fixed to the lower main surface 16 of the main body 14, for example by gluing (preferably on the entire contact surface) or mechanical constraint, and that in turn comprises the one or more inductors 2.

In turn, the flexible body 9 comprises alternating at least first, electrically insulating layers 4 and second layers 20, where each second layer 20 comprises at least one electrically conductive track 5. It should be noticed that whilst the thickness of each first layer 4 is advantageously substantially constant and not null, that of the second layers 20 may vary significantly and, in some preferred embodiments may even be null where the electrically conductive tracks 5 are not present. The representation of the second layers 20 in FIGS. 1 and 8 (where the thickness is constant and the second layers 20 comprise empty spaces) must therefore be considered to have been provided by way of example only, without limiting the scope of the invention.

Advantageously, the second layers 20 of the flexible body 9 are stuck to all of the first layers 4 adjacent to them.

Moreover, advantageously, the flexible body 9 has one of the first layers 4 drawn near the main body 14 and facing the lower main surface 16. Preferably, at least at the flexible body 9, the main body 14 has a laminar structure and the upper main surface 15 is parallel to the lower main surface 16. Depending on the shape of the main body 14, the flexible body 9 may have an overall shape that is substantially flat or may have more complex shapes with one or more concavities/convexities substantially dictated by the shape of the lower main surface 16. In fact, its flexibility allows the flexible body 9 to adapt to the shape of the lower main surface 16 of the main body 14.

However, it should be noticed that in other embodiments the flexible body 9 may have a different structure (that comprises, for example, a different number of layers, a different alternation of layers, layers that are made in a different way, etc.) provided that between two layers that comprise electrically conductive tracks 5 there is always an electrical insulation present.

The inductor 2 comprises a plurality of electrically conductive tracks 5 which are positioned at different second layers 20 (advantageously all of the tracks if there is only one inductor 2 present), and the electrically conductive tracks 5 are electrically connected to each other in series and/or parallel to form a plurality of loops extending in the same direction about a central axis substantially perpendicular to the first surface (that is, to the upper main surface 15). In fact, in the flexible body 9 all of the electrically conductive tracks 5 of an inductor 2 extend about the same central axis.

In the case in which the hob 1 comprises a plurality of separate inductors 2 side by side (inductors 2 that, in the known way, may be positioned exclusively in just a few predetermined heating positions, one for each position, or side by side to substantially cover the entire extent of the cooking zone of the hob 1) it shall be understood that what was just described is also valid for each inductor 2. Therefore, in that case, each of the second layers 20 advantageously comprises at least one separate electrically conductive track 5 for each inductor 2, and each inductor 2 comprises a plurality of electrically conductive tracks 5 positioned at different second layers 20 and electrically connected to each other in series and/or parallel to form a plurality of loops extending in the same direction about a central axis substantially perpendicular to the first surface (upper main surface 15) and which is different for each inductor 2.

Moreover, in the preferred embodiments, for each inductor 2 present, each second layer 20 comprises a plurality of electrically conductive tracks 5 extending with electrical continuity about the central axis only for half a turn or less, and each loop of the inductor 2 is made in such a way that it extends over two or more separate second layers 20.

Furthermore, it may even be the case that each loop comprises a plurality of electrically conductive tracks 5 that are connected to one another in parallel.

Moreover, in the preferred embodiment, for each inductor 2 the hob 1 also comprises a magnetic flow concentrator positioned on the opposite side to the main body 14.

Advantageously, for that purpose, the flexible body 9 also comprises a stratiform base 17 that is also flexible and is at least partly constituted of a ferromagnetic material. The stratiform base 17 is applied to the rest of the flexible body 9 in such a way that each inductor 2 is positioned between the main body 14 and the stratiform base 17.

In accordance with a first embodiment, the stratiform base 17 comprises an electrically insulating matrix in which the ferromagnetic material in the form of powder or granules is embedded.

In contrast, according to a second embodiment, the stratiform base 17 comprises a third layer constituted of the ferromagnetic material and a fourth layer that is electrically insulating, the third layer being positioned between each inductor 2 and the fourth layer.

In the preferred embodiments, the ferromagnetic material may be ferrite, the third layer may be constituted of a paint and/or the electrically insulating matrix or respectively the fourth layer may be constituted of a vulcanised silicone rubber-based material.

As already indicated with reference to the method described above, the hob 1 may also comprise one or more temperature sensors (not illustrated) inserted in the flexible body 9, or proximity or contact or other sensors, even advantageously constituted of/comprising one or more electrically conductive tracks 5 suitably made in one or more second layers 20.

In the case in which the hob 1 is understood to be exclusively the active part of the product intended for the end use, that is to say, the part that only comprises the main body 14 and the inductors 2 with the related mechanical structures (flexible body 9, etc.), the hob 1 will have the electrical terminals of each inductor 2 (or of one or more loops of each inductor 2) exposed and accessible, for allowing their connection to the electronic control system and the electric power supply.

In contrast, if the hob 1 is understood to be the end product, ready for use, it will also comprise both the electric power supply part, the controls or a user interface, and an electronic control system if necessary, suitably connected to each other and to the electrical terminals of the inductors 2 or of the one or more loops of the inductors 2.

This invention brings important advantages.

First, thanks to this invention it was possible to provide a method for making induction hobs that is simpler than the prior art methods, requires less labour for its implementation, has lower costs particularly when making a large number of inductors, and allows hobs to be made that are less affected by knocks than prior art hobs are.

Second, irrespective of the method used to make them, the hobs according to this invention on one hand are lighter and more manageable than those currently on the market, and on the other hand they are less exposed to risks of breakage after accidental knocks, thanks to the fact that they do not have rigid parts in contact with the main body. Other factors being equal, this may allow hobs to be made with a thinner main body compared to prior art hobs, thereby also increasing the efficiency of the coupling between inductor and pan.

Furthermore, thanks to the method according to this invention, it is possible to make hobs with a higher geometric precision and/or resolution of the loops, especially in the more complex configurations with a large number of inductors. That means that it is also possible, almost without any additional cost, to make hobs with a larger number of inductors than prior art hobs (especially for applications in which the hob does not have predetermined cooking positions).

Finally, it should be noticed that this invention is relatively easy to produce and that even the cost linked to implementing the invention is not very high. The invention described above may be modified and adapted in several ways without thereby departing from the scope of the inventive concept. All details may be substituted with other technically equivalent elements and the materials used, as well as the shapes and dimensions of the various components, may vary according to requirements.

The invention claimed is:

1. An induction hob comprising:
a main body presenting an upper main surface, on which in use at least one pan to be heated is to be placed, and a lower main surface;
at least one inductor coupled to the main body at the lower main surface; and a flexible body, fixed to the lower main surface of the main body;
wherein:
the flexible body in turn comprises alternating first, electrically insulating layers and second layers;
each of the second layers comprises at least one electrically conductive track;
the at least one inductor comprises a plurality of said electrically conductive tracks which are positioned at different second layers and are electrically connected to each other in series and/or parallel to form a plurality of loops extending in the same direction about a central axis perpendicular to the upper main surface; and
the flexibility of the flexible body is such that it allows the flexible body to adapt to a shape of the lower main surface of the main body, so that, depending on the shape of the main body, the flexible body has an overall shape that is flat or has a more complex shape with one or more concavities/convexities dictated by the shape of the lower main surface.

2. The induction hob according to claim 1, comprising a plurality of inductors and wherein each of the second layers comprises at least one separate electrically conductive track for each inductor, and wherein each inductor comprises a plurality of said electrically conductive tracks positioned at different second layers and electrically connected to each other in series and/or parallel to form a plurality of loops extending in the same direction about a central axis perpendicular to the upper main surface.

3. The induction hob according to claim 1, wherein the flexible body also comprises a stratiform base which is flexible and is at least partly constituted of a ferromagnetic material, each inductor being positioned between the main body and the stratiform base.

4. The induction hob according to claim 3, wherein alternatively:
either the ferromagnetic material is in the form of powder or granules and the stratiform base comprises an electrically insulating matrix in which the ferromagnetic material is embedded; or
the stratiform base comprises a third layer constituted of the ferromagnetic material and a fourth layer that is electrically insulating, the third layer being positioned between each inductor and the fourth layer.

5. The induction hob according to claim 4, wherein, in the first alternative, the ferromagnetic material is ferrite and/or the electrically insulating matrix is constituted of a vulcanized silicone rubber-based material; or
wherein, in the second alternative, the ferromagnetic material is ferrite and/or the third layer is constituted of a paint of ferromagnetic material and/or the fourth layer is constituted of a vulcanized silicone rubber-based material.

6. The induction hob according to claim 1, wherein the flexible body has one of the first layers drawn near to the main body and facing the lower main surface.

7. The induction hob according to claim 1, wherein the flexible body is glued to the main body or is mechanically constrained to it.

8. The induction hob according to claim 1, wherein the main body has a laminar structure and the upper main surface is parallel to the lower main surface at least at the flexible body.

9. The induction hob according to claim 1, wherein, for each inductor, each second layer comprises a plurality of electrically conductive tracks extending with electrical continuity about the central axis for half a turn or less, each loop of the inductor extending over two or more second layers.

10. The induction hob according to claim 1, wherein, for each inductor, each second layer comprises at least one electrically conductive track extending with electrical continuity about the central axis for a plurality of turns defining a plurality of loops of the inductor.

11. The induction hob according to claim 1, wherein each loop comprises a plurality of electrically conductive tracks connected in parallel.

12. The induction hob according to claim 1, wherein the second layers of the flexible body are stuck to the first layers adjacent to them.

13. The induction hob according to claim 1, also comprising one or more temperature sensors, or one or more proximity or contact sensors, or other sensors, the sensor or sensors being inserted in the flexible body.

14. The induction hob according to claim 13, wherein one or more of said sensors is constituted of, or comprises, one or more electrically conductive tracks made in one or more second layers.

15. The induction hob according to claim 1, wherein the upper main surface is flat or comprises one or more concavities and/or convexities.

16. The induction hob according to claim 1, wherein each first, electrically insulating layer is constituted of, or comprises, vulcanized silicone rubber or a polyimide or an aramid paper.

17. The induction hob according to claim 1, wherein each first, electrically insulating layer has a thickness between 25 and 250 μm.

* * * * *